United States Patent
Lee et al.

(10) Patent No.: US 6,864,651 B1
(45) Date of Patent: Mar. 8, 2005

(54) BI-DIRECTIONAL MOTOR CONTROL CIRCUIT

(75) Inventors: Rong-Chin Lee, Pingtung County (TW); Li-Cheng Chen, Kaohsiung (TW)

(73) Assignee: Aimtron Technology Corp., Hsin-Chu (TW)

( * ) Notice: Subject to any disclaimer, the term of this patent is extended or adjusted under 35 U.S.C. 154(b) by 0 days.

(21) Appl. No.: 10/710,397

(22) Filed: Jul. 8, 2004

(51) Int. Cl.[7] ................................................ H02P 3/14
(52) U.S. Cl. ..................... 318/280; 318/375; 318/376; 318/293; 318/370
(58) Field of Search .......................... 318/57, 138, 245, 318/254, 439, 280–286, 293, 294, 370–376; 363/17, 98

(56) References Cited

U.S. PATENT DOCUMENTS

| | | | | |
|---|---|---|---|---|
| 4,169,990 A | * | 10/1979 | Lerdman | 318/138 |
| 4,477,751 A | * | 10/1984 | Kanayama | 318/280 |
| 4,545,004 A | | 10/1985 | Kade et al. | |
| 4,678,973 A | * | 7/1987 | Elliott et al. | 318/254 |
| 4,782,272 A | * | 11/1988 | Buckley et al. | 318/254 |
| 5,125,067 A | * | 6/1992 | Erdman | 388/811 |
| 5,227,704 A | * | 7/1993 | Erdman | 318/254 |
| 5,234,066 A | * | 8/1993 | Ahsing et al. | 180/6.5 |
| 5,289,089 A | | 2/1994 | Aoki | |
| 5,744,922 A | * | 4/1998 | Neary et al. | 318/293 |
| 5,990,644 A | * | 11/1999 | Furuya et al. | 318/293 |
| 6,384,556 B1 | * | 5/2002 | Mizumoto et al. | 318/293 |
| 6,713,979 B2 | * | 3/2004 | Naito et al. | 318/280 |

* cited by examiner

Primary Examiner—Paul Ip
(74) Attorney, Agent, or Firm—Winston Hsu

(57) ABSTRACT

A motor control circuit includes a forward rotation control circuit, a reverse rotation control circuit, and a brake control circuit. The forward rotation control circuit allows a first current source to supply a first current signal to a motor drive circuit for operating a motor in a forward rotation mode. The reverse rotation control circuit allows a third current source to supply a third current signal to the motor drive circuit for operating the motor in a reverse rotation mode. The brake control circuit allows a second current source and a fourth current source to respectively supply a second current signal and a fourth current signal to the motor drive circuit for operating the motor in a brake mode. The motor control circuit reduces power dissipation in the brake mode since the second and fourth current signals may be smaller than the first and third current signals.

20 Claims, 5 Drawing Sheets

BI-DIRECTIONAL MOTOR CONTROL CIRCUIT

BACKGROUND OF INVENTION

1. Field of the Invention

The present invention relates to a control circuit and, more particularly, to a motor control circuit for controlling an H-bridge drive circuit to operate a bi-directional motor among a forward rotation mode, a brake mode, and a, reverse rotation mode.

2. Description of the Related Art

FIG. 1(a) is a detailed circuit diagram showing a conventional motor control circuit 10. FIG. 1(b) is a timing chart showing an operation of the conventional motor control circuit 10. Referring to FIG. 1(a), a bi-directional motor M is connected with an H-bridge drive circuit 1, and the motor control circuit 10 operates the bi-directional motor M among a standby mode, a forward rotation mode, a brake mode, and a reverse rotation mode through controlling the H-bridge drive circuit 1. More specifically, the H-bridge drive circuit 1 is constructed by six drive transistors Q1 to Q6. A terminal Na of the bi-directional motor M is coupled to a collector electrode of the pnp transistor Q1 and a collector electrode of the npn transistor Q3. A terminal Nb of the bi-directional motor M is coupled to a collector electrode of the pnp transistor Q2 and a collector electrode of the npn transistor Q4. Emitter electrodes of the transistors Q1 and Q2 are connected together to a drive voltage source Vd while emitter electrodes of the transistors Q3 and Q4 are connected together to a ground potential. The transistors Q1 to Q4 are provided with flywheel diodes D1 to D4, respectively, for allowing the electromotive force-induced current to flow through when the transistors Q1 to Q4 are turned off. The npn transistor Q5 has a collector electrode coupled to a base electrode of the transistor Q1, and an emitter electrode coupled to a base electrode of the transistor Q4. The npn transistor Q6 has a collector electrode coupled to a base electrode of the transistor Q2 and an emitter electrode coupled to a base electrode of the transistor Q3.

The motor control circuit 10 has a forward rotation current source constructed by a pnp transistor Q7 and a reverse rotation current source constructed by a pnp transistor Q8. The transistor Q7 is biased by a control voltage source Vc1 for providing a control current Ic1. The transistor Q8 is biased by a control voltage source Vc2 for providing a control current Ic2. The control current Ic1 is split at a diverging node N1 into a first partial current If1 and a second partial current If2. The first partial current If1 is supplied to the base electrode of the transistor Q5 while the second partial current If2 is supplied to the base electrode of the transistor Q4. On the other hand, the control current Ic2 is split at a diverging node N2 into a first partial current Ir1 and a second partial current Ir2. The first partial current Ir1 is supplied to the base electrode of the transistor Q6 while the second partial current Ir2 is supplied to the base electrode of the transistor Q3.

In response to a forward rotation command signal FWD and a reverse rotation command signal REV, the motor control circuit 10 controls the motor drive circuit 1 to operate the motor M among a standby mode, a forward rotation mode, a brake mode, and a reverse rotation mode. Each of the forward and reverse rotation command signals FWD and REV is a logic signal having a HIGH state and a LOW state. When the forward rotation command signal FWD and the reverse rotation command signal REV are both at the LOW state, npn transistors Q11 and Q12 are turned off. As a result, the control currents Ic1 and Ic2 supplied from the control voltage sources Vc1 and Vc2 are zero, which may be exemplified by periods T1, T4, and T7 shown in FIG. 1(b). In this case, the motor control circuit 10 is prohibited from supplying the four partial currents If1, If2, Ir1, and Ir2 and then makes all of the drive transistors Q1 to Q6 nonconductive, thereby operating the motor M in the standby mode.

When the forward rotation command signal FWD is at the HIGH state and the reverse rotation command signal REV is at the LOW state, the transistor Q11 is turned on and the transistor Q12 is turned off. The control current Ic1 supplied from the control voltage source Vc1 has a maximum Ic1m and the control current Ic2 supplied from the control voltage source Vc2 is zero, which may be exemplified by period T2 shown in FIG. 1(b). At this time, the first partial current If1 of the control current Ic1 is allowed to be supplied to the base electrode of the drive transistor Q5 because npn transistor Q9 which is controlled by the reverse rotation command signal REV is turned off. As a result, the transistors Q1 and Q4 are turned on for allowing a forward current to flow from the terminal Na to the terminal Nb, thereby operating the motor M in the forward rotation mode.

When the forward rotation command signal FWD and the reverse rotation command signal REV are both at the HIGH state, the transistors Q11 and Q12 are turned on. The control current Ic1 supplied from the control voltage source Vc1 has a maximum Ic1m and the control current Ic2 supplied from the control voltage source Vc2 has a maximum Ic2m, which may be exemplified by periods T3 and T6 shown in FIG. 1(b). At this time, the first partial current If1 of the control current Ic1 is bypassed down to the ground potential though the transistor Q9 which is also turned on by the reverse rotation command signal REV, and therefore prevented from being supplied to the base electrode of the drive transistor Q5. Likely, the first partial current Ir1 of the control current Ic2 is bypassed down to the ground potential though the transistor Q10 which is also turned on by the forward rotation command signal FWD, and therefore prevented from being supplied to the base electrode of the drive transistor Q6. However, the second partial current If2 of the control current Ic1 is allowed to be supplied to the base electrode of the drive transistor Q4 and the second partial current Ir2 of the control current Ic2 is allowed to be supplied to the base electrode of the drive transistor Q3. In this case, the motor current is gradually attenuated to zero when circling in a closed loop composed of the conductive transistors Q3 and Q4 and the motor M, which is referred to as the brake mode.

When the forward rotation command signal FWD is at the low state and the reverse rotation command signal REV is at the HIGH state, the transistor Q11 is turned off and the transistor Q12 is turned on. As a result, the control current Ic1 supplied from the control voltage source Vc1 is zero and the control current Ic2 supplied from the control voltage source Vc2 has a maximum Ic2m, which may be exemplified by a period T5 shown in FIG. 1(b). At this time, the first partial current Ir1 of the control current Ic2 is allowed to be supplied to the base electrode of the drive transistor Q6 because the transistor Q10 which is controlled by the forward rotation command signal FWD is turned off. As a result, the transistors Q2 and Q3 are turned on for allowing a reverse current to flow from the terminal Nb to the terminal Na, thereby operating the motor M in the reverse rotation mode.

Although the conventional motor control circuit 10 effectively controls the various operational modes of the motor M, several problems are inevitably caused in its practical applications. Referring to FIG. 1(b), a curve 11 illustrates the control current Ic1 supplied from the control voltage source Vc1 of the motor control circuit 10 among the operational modes. As clearly identified in the curve 11, the control voltage source Vc1 supplies the same control current Ic1 with the maximum Ic1m regardless of the forward rotation mode and the brake mode. However, as described above, the first partial current If1 of the control current Ic1 in the brake mode is bypassed down to the ground through the conductive transistor Q9 and has nothing to do with controlling the motor drive circuit 1, resulting in a meaningless waste of power. Referring to FIG. 1(b), a curve 12 illustrates the control current Ic2 supplied from the control voltage source Vc2 of the motor control circuit 10 among the operational modes. As clearly identified in the curve 12, the control voltage source Vc2 supplies the same control current Ic2 with the maximum Ic2m regardless of the reverse rotation mode and the brake mode. However, as described above, the first partial current Ir1 of the control current Ic2 in the brake mode is bypassed down to the ground through the conductive transistor Q10 and has nothing to do with controlling the motor drive circuit 1, resulting in a meaningless waste of power.

Referring to FIG. 1(b), a curve 13 illustrates a total control current consumption of the conventional motor control circuit 10 among the operational modes, i.e. a superposition of the currents Ic1 and Ic2 (the curves 11 and 12). As clearly identified in the curve 13, the total control current consumption in the brake mode is twice larger than that in the forward or reverse rotation mode. As described above, the doubling of the total control current consumption is not required by the practical controlling operation and only causes the meaningless waste of power. Therefore, the conventional motor control circuit 10 has a problem with regard to inefficiency and in turn raises operational temperature due to heat generation. A significantly high temperature may cause the circuit malfunction or shut down by thermal protection mechanism.

Furthermore, the practical magnitude of the control current Ic1 changes in accordance with the control voltage source Vc1 since the control current Ic1 is generated by the control voltage source Vc1 through the transistor Q7 and the bias resistor. Similarly, the practical magnitude of the control current Ic2 changes in accordance with the control voltage source Vc2 since the control current Ic2 is generated by the control voltage source Vc2 through the transistor Q8 and the bias resistor. Because the control currents Ic1 and Ic2 directly affects the operation points of the drive transistors Q1 to Q6, the fluctuation of the control voltage sources Vc1 and Vc2 brings about a problem with regard to operational instability of the motor M.

SUMMARY OF INVENTION

In view of the above-mentioned problems, an object of the present invention is to provide a motor control circuit capable of preventing the control currents from being bypassed down to the ground in the brake mode, thereby reducing the power dissipation and suppressing the rise of temperature.

Another object of the present invention is to provide a motor control circuit capable of controlling the brake mode by using a relatively low control current, thereby reducing the power dissipation and suppressing the rise of temperature.

Still another object of the present invention is to provide a motor control circuit capable of supplying the control currents by using constant current sources independent of the fluctuation of the control voltage sources, thereby enhancing the operational stability of the motor.

According to one aspect of the present invention, a motor control circuit is provided for controlling a motor drive circuit to operate a motor among a forward rotation mode, a reverse rotation mode, and a brake mode. The motor control circuit includes a forward rotation control circuit, a reverse rotation control circuit, and a brake control circuit.

The forward rotation control circuit allows a first current source to supply a first current signal to the motor drive circuit, thereby operating the motor in the forward rotation mode. The reverse rotation control circuit allows a third current source to supply a third current signal to the motor drive circuit, thereby operating the motor in the reverse rotation mode. The brake control circuit allows a second current source and a fourth current source to supply a second current signal and a fourth current signal, respectively, to the motor drive circuit, thereby operating the motor in the brake mode. Since the motor control circuit in the brake mode only allows supplying the second and the fourth current signals, the first and the third current signals are prevented from causing undesirable power dissipation.

Preferably, the second current signal is smaller than the first current signal. The fourth current signal is smaller than the third current signal. The motor control circuit effectively reduces the power dissipation and then sup presses the rise of temperature since the second and the fourth current signals are smaller than the first and the third current signals.

Preferably, each of the first to fourth current sources is implemented by a constant current source. The operational stability of the motor is enhanced since the first to fourth current signals supplied from the constant current sources are independent of the fluctuation of control voltage sources.

Preferably, the forward rotation control circuit includes a switch and a logical circuit. The switch is coupled to the first current source. In response to a forward rotation command signal and a reverse rotation command signal, the logical circuit controls the switch for allowing the first current signal to be supplied to the motor drive circuit.

Preferably, the reverse control circuit includes a switch and a logical circuit. The switch is coupled to the third current source. In response to a forward rotation command signal and a reverse rotation command signal, the logical circuit controls the switch for allowing the third current signal to be supplied to the motor drive circuit.

Preferably, the brake control circuit includes a first switch and a second switch. The first switch is coupled to the second current source for allowing the second current signal to be supplied to the motor drive circuit in response to a forward rotation command signal. The second switch is coupled to the fourth current source for allowing the fourth current signal to be supplied to the motor drive circuit in response to a reverse rotation command signal.

BRIEF DESCRIPTION OF DRAWINGS

The above-mentioned and other objects, features, and advantages of the present invention will become apparent with reference to the following descriptions and accompanying drawings, wherein.

DETAILED DESCRIPTION

The preferred embodiments according to the present invention will be described in detail with reference to the drawings.

Figure 1A:
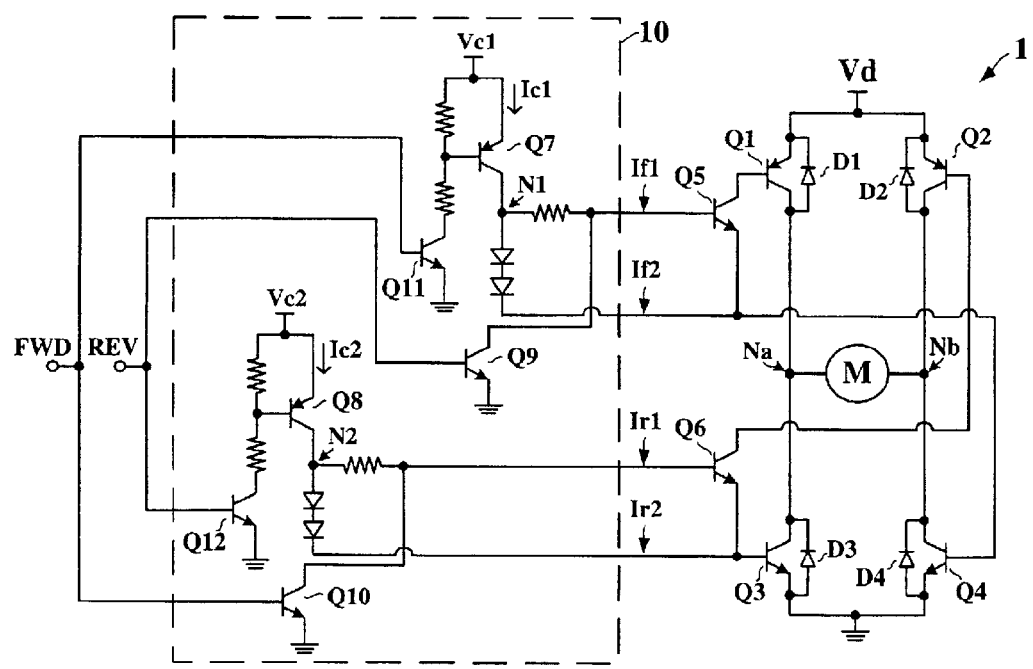
FIG. 1(a) is a detailed circuit diagram showing a conventional motor control circuit.
Figure 1B:
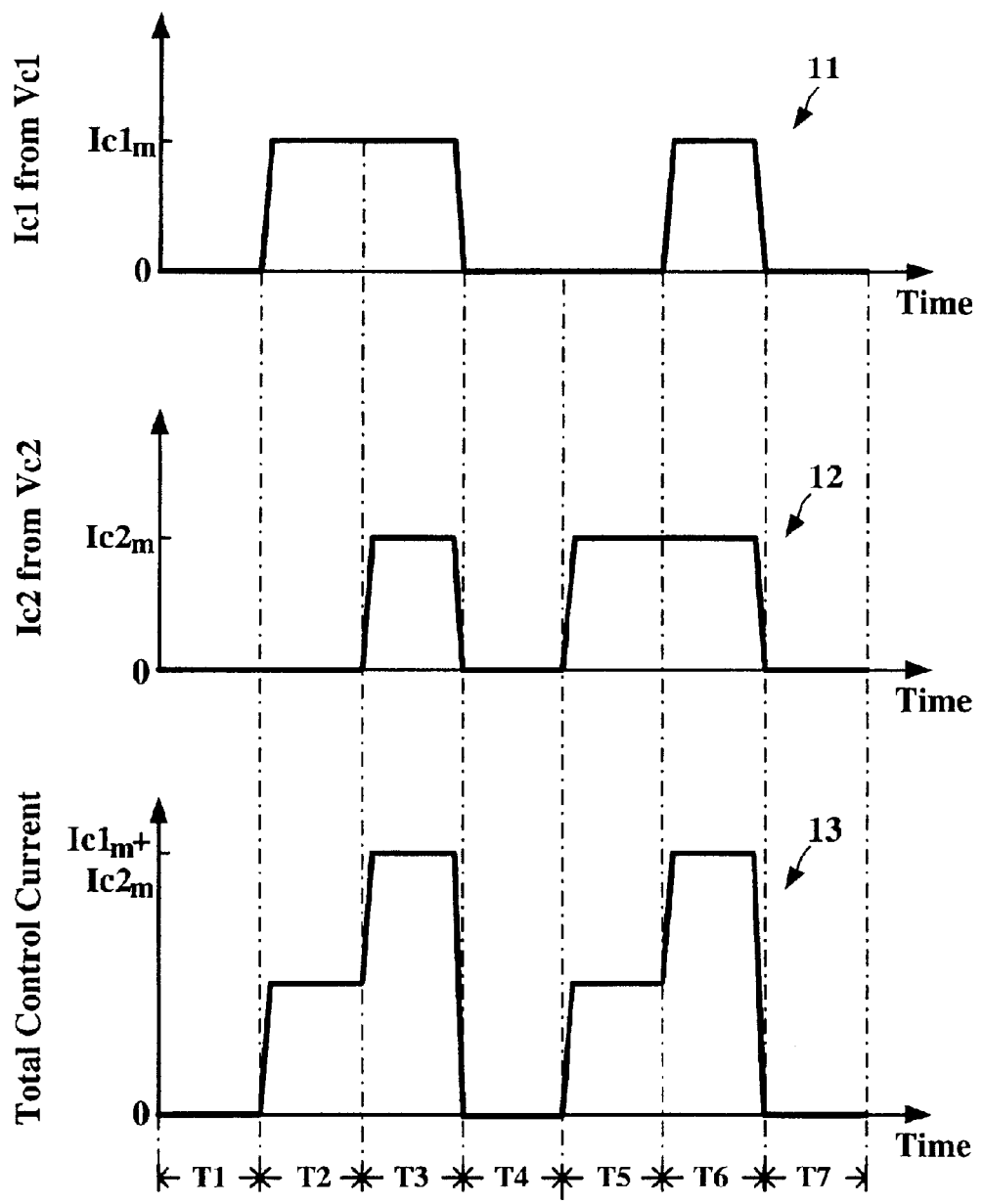
FIG. 1(b) is a timing chart showing an operation of a conventional motor control circuit.
Figure 2A:
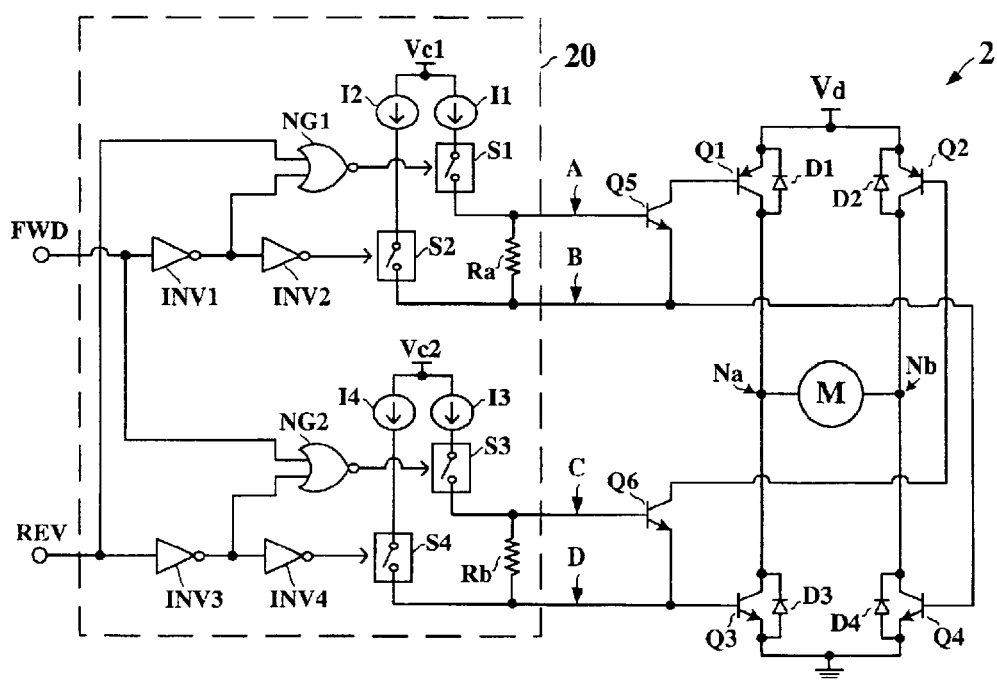
FIG. 2(a) is a detailed circuit diagram showing a motor control circuit according to a first embodiment of the present invention.
Figure 2B:
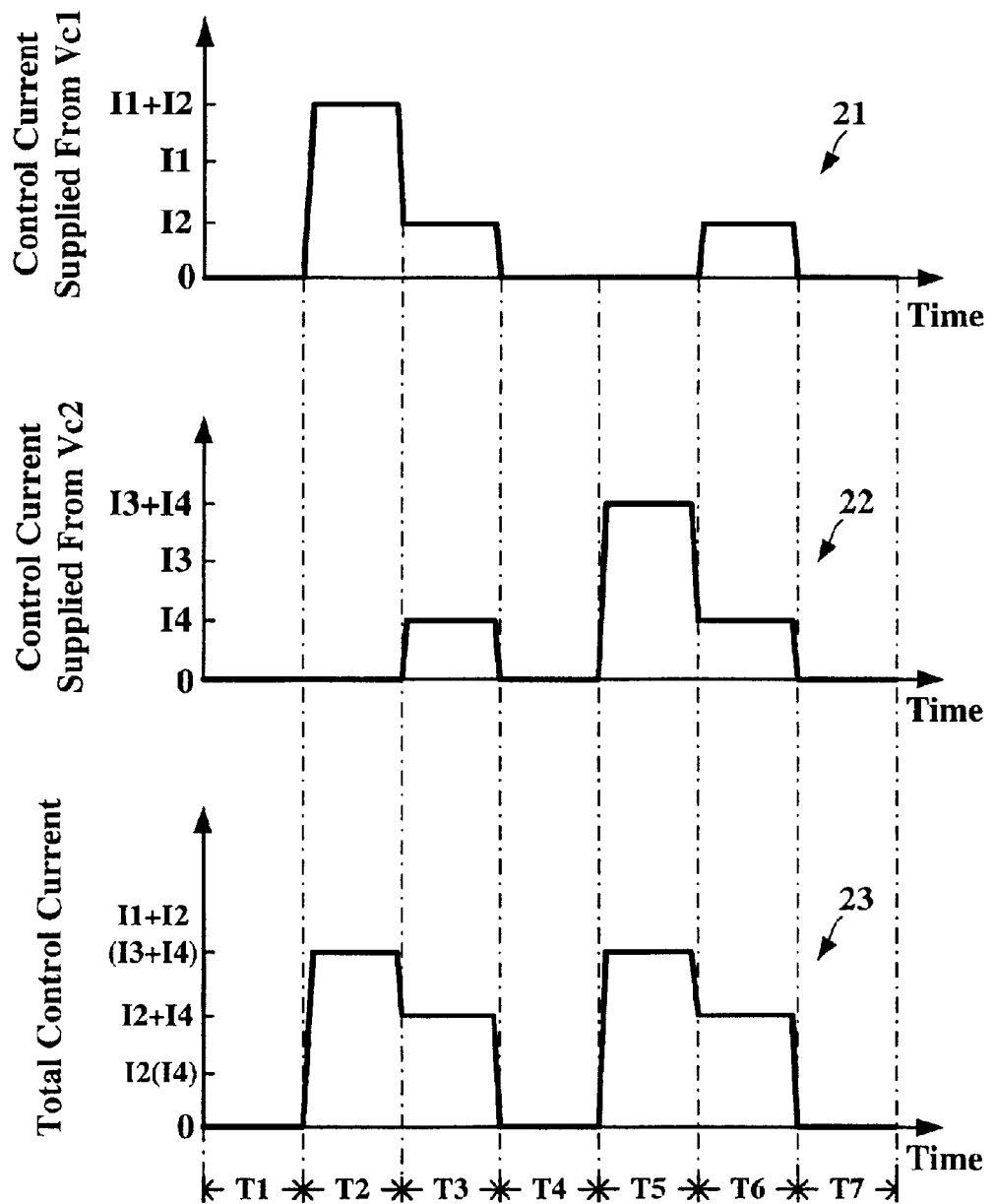
FIG. 2(b) is a timing chart showing an operation of a motor control circuit according to a first embodiment of the present invention.

FIG. 2(a) is a detailed circuit diagram showing a motor control circuit 20 according to a first embodiment of the present invention. FIG. 2(b) is a timing chart showing an operation of the motor control circuit 20 according to the first embodiment of the present invention. Referring to FIG. 2(a), a motor M is connected with an H-bridge drive circuit 2, and the motor control circuit 20 operates the motor M among a standby mode, a forward rotation mode, a brake mode, and a reverse rotation mode through controlling the H-bridge drive circuit 2. The H-bridge drive circuit 2 shown in FIG. 2(a) is the same as the H-bridge drive circuit 1 shown in FIG. 1(a) and, for the sake of simplification, descriptions with regard to the structure and operation of the H-bridge drive circuit 2 will be omitted hereinafter.

The motor control circuit 20 is provided with four current sources 11 to 14, in which the current sources 11 and 12 are coupled to a control voltage source Vc1 while the current sources 13 and 14 are coupled to a control voltage source Vc2. In one embodiment, the control voltage sources Vc1 and Vc2 are identical with respect to each other. The current source 11 may supply a current twice larger than the current source 12 does while the current source 13 may supply a current twice larger than the current source 14 does. The current from the current source 11 may be set equal in magnitude to that from the current source 13 while the current from the current source 12 may be set equal in magnitude to that from the current source 14. The current source 11 is coupled to the base electrode of the drive transistor Q5 through a switch S1, for supplying a control current signal A. The current source 12 is coupled to the base electrode of the drive transistor Q4 through a switch S2, for supplying a control current signal B. The current source 13 is coupled to the base electrode of the drive transistor Q6 through a switch S3, for supplying a control current signal C. The current source 14 is coupled to the base electrode of the drive transistor Q3 through a switch S4, for supplying a control current signal D.

The switch S1 is controlled by an output terminal of a NOR gate NG1. The NOR gate NG1 is employed to perform a NOR logical operation between a forward rotation command signal FWD, after inverted by an inverter INV1, and a reverse rotation command signal REV. The switch S2 is controlled by the forward rotation command signal FWD after inverted by series-connected inverters INV1 and INV2. The switch S3 is controlled by an output terminal of a NOR gate NG2. The NOR gate NG2 is employed to perform a NOR logical operation between a forward rotation command signal FWD and a reverse rotation command signal REV after inverted by an inverter INV3. The switch S4 is controlled by the reverse rotation command signal REV after inverted by series-connected inverters INV3 and INV4.

Each of the forward and reverse rotation command signals FWD and REV is a logical signal having a HIGH state and a LOW state. When the forward rotation command signal FWD and the reverse rotation command signal REV are both at the LOW state, the NOR gate NG1 outputs LOW for turning off the switch S1, the inverter INV2 outputs LOW for turning off the switch S2, the NOR gate NG2 outputs LOW for turning off the switch S3, and the inverter INV4 outputs LOW for turning off the switch S4. Since the switches S1 to S4 are all turned off, the current sources 11 to 14 are prevented from supplying any currents, which may be exemplified by periods T1, T4, and T7 shown in FIG. 2(b). In this case, the drive transistors Q1 to Q6 are all turned off, thereby operating the motor M in the standby mode.

When the forward rotation command signal FWD is at the HIGH state and the reverse rotation command signal REV is at the LOW state, the NOR gate NG1 outputs HIGH for turning on the switch 1, the inverter INV2 outputs HIGH for turning on the switch S2, the NOR gate NG2 outputs LOW for turning off the switch S3, and the inverter INV4 outputs LOW for turning off the switch S4. Since the switches S1 and S2 are both turned on, the current sources I1 and I2 are allowed to supply the control currents to the base electrodes of the transistors Q5 and Q4, respectively, serving as the control current signals A and B. On the other hand, since the switches S3 and S4 are both turned off, the current sources 13 and 14 are prevented from supplying any currents to the base electrodes of the drive transistors Q6 and Q3. As a result, the control current supplied from the control voltage source Vc1 has a magnitude of I1+I2 and the control current supplied from the control voltage source Vc2 is zero, which may be exemplified by a period T2 shown in FIG. 2(b). In this case, the drive voltage source Vd supplies a forward current to flow from the terminal Na to the terminal Nb through the conductive transistors Q1 and Q4, thereby operating the motor M in the forward rotation mode.

When the forward rotation command signal FWD and the reverse rotation command signal REV are both at the HIGH state, the NOR gate NG1 outputs LOW for turning off the switch S1, the inverter INV2 outputs HIGH for turning on the switch S2, the NOR gate NG2 outputs LOW for turning off the switch S3, and the inverter INV4 outputs HIGH for turning on the switch S4. Since the switches S1 and S3 are both turned off, the current sources I1 and I3 are prevented from supplying any currents to the base electrodes of the transistors Q5 and Q6. However, since the switches S2 and S4 are both turned on, the current sources I2 and I4 are allowed to supply the control currents to the base electrodes of the transistors Q4 and Q3, respectively, serving as the control current signals B and D. As a result, the control current supplied from the control voltage source Vc1 has a magnitude of I2 and the control current supplied from the control voltage source Vc2 has a magnitude of I4, which may be exemplified by periods T3 and T6 shown in FIG. 2(b). In this case, the motor current is gradually attenuated to zero when circling in a closed loop consisting of the conductive transistors Q3 and Q4 and the motor M, which is referred to as the brake mode.

When the forward rotation command signal FWD is at the LOW state and the reverse rotation command signal REV is at the HIGH state, the NOR gate NG1 outputs LOW for turning off the switch S1, the inverter INV2 outputs LOW for turning off the switch S2, the NOR gate NG2 outputs HIGH for turning on the switch S3, and the inverter INV4 outputs HIGH for turning on the switch S4. Since the switches S1 and S2 are both turned off, the current sources I1 and I2 are prevented from supplying currents to the base electrodes of the drive transistors Q5 and Q4. On the other hand, since the switches S3 and S4 are both turned on, the current sources I3 and I4 are allowed to supply the control currents to the base electrodes of the drive transistors Q6 and Q3, respectively, serving as the control current signals C and D. As a result, the control current supplied from the control voltage source Vc1 is zero and the control current supplied from the control voltage source Vc2 has a magnitude of I3+I4, which may be exemplified by a period T5 shown in FIG. 2(b). In this case, the drive voltage Vd supplies a reverse current to flow from the terminal Nb to the terminal Na through the conductive transistors Q2 and Q3, thereby operating the motor M in the reverse rotation mode.

It should be noted that the motor control circuit 20 according to the first embodiment of the present invention is further provided with resistors Ra and Rb. The resistor Ra is coupled between the base electrode of the drive transistor Q5 and the base electrode of the drive transistor Q4. During a transient period of the switch S1 from conductive to nonconductive, the charge accumulated between the base and emitter electrodes of the drive transistor Q5 may be removed though the resistor Ra and therefore the drive transistor Q5 is turned off more rapidly. Similarly, the resistor Rb is coupled between the base electrode of the drive transistor Q6 and the base electrode of the drive transistor Q3. During a transient period of the switch S3 from conductive to nonconductive, the charge accumulated between the base and emitter electrodes of the drive transistor Q6 may be removed though the resistor Rb and therefore the drive transistor Q5 is turned off more rapidly.

As described above, the motor control circuit 20 according to the first embodiment of the present invention effectively controls the motor M among the forward rotation mode, the brake mode, and the reverse rotation mode. In addition, the motor control circuit 20 provides the following advantages. Firstly, in one embodiment, each of the current sources 11 to 14 may be implemented by a constant current source which supplies the corresponding one of the control current signals A to D independent of the fluctuation of the control voltage sources Vc1 and Vc2. Therefore, the motor control circuit 20 enhances the operational stability of the motor M.

Referring to FIG. 2(b), a curve 21 illustrates the control current supplied from the control voltage source Vc1 of the motor control circuit 20 among the operational modes. As clearly identified in the curve 21, the control voltage source Vc1 in the brake mode is required to supply a single current I2 only, in contrast with two currents I1 and I2 required in the forward rotation mode. Moreover, the single control current I2 from the control voltage source Vc1 in the brake mode is completely applied to drive the transistor Q4 without being bypassed down to the ground. Therefore, the motor control circuit 20 according to the present invention eliminates the meaningless waste of power and effectively suppresses the rise of temperature. Referring to FIG. 2(b), a curve 22 illustrates the control current supplied from the control voltage source Vc2 of the motor control circuit 20 among the operational modes. As clearly identified in the curve 22, the control voltage source Vc2 in the brake mode is required to supply a single current I4 only, in contrast with two currents I3 and I4 required in the reverse rotation mode. Moreover, the single control current I4 from the control voltage source Vc2 in the brake mode is completely applied to drive the transistor Q3 without being bypassed down to the ground. Therefore, the motor control circuit 20 according to the present invention eliminates the meaningless waste of power and effectively suppresses the rise of temperature. Referring to FIG. 2(b), a curve 23 illustrates a total control current consumption of the motor control circuit 20 among the operational modes, i.e. a superposition of the control currents from the control voltage sources Vc1 and Vc2 (the curves 21 and 22). As clearly identified in the curve 23, the total control current consumption in the brake mode is two third smaller than that in the forward or reverse rotation mode. Therefore, the motor control circuit 20 achieves a highly efficient operation.

Figure 3:
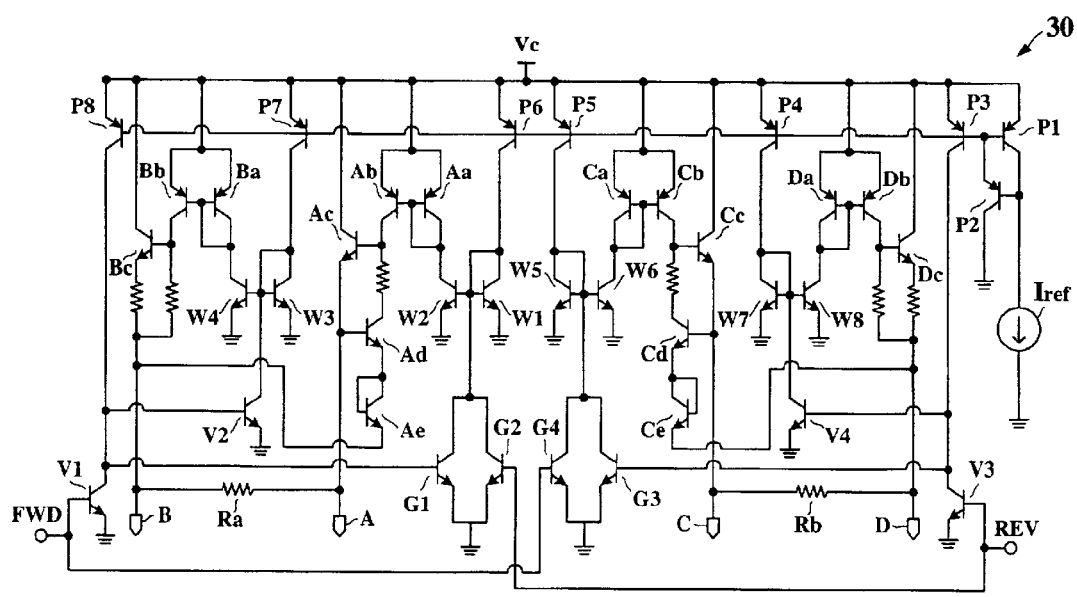
FIG. 3 is a detailed circuit diagram showing a motor control circuit according to a second embodiment of the present invention.

FIG. 3 is a detailed circuit diagram showing a motor control circuit 30 according to a second embodiment of the present invention. Referring to FIG. 3, the motor control circuit 30 generates four control current signals A to D from four current sources, respectively, in response to a forward rotation command signal FWD and a reverse rotation command signal REV. Pnp transistors P1 to P8 form a current source having multiple parallel output stages, coupled to a control voltage source Vc, for providing a reference current Iref to other components in the circuit. The transistors P1 and P2 form a Darlington pair. The transistors P3 and P8, serving as the multiple current output stages, have base electrodes all connected to a base electrode of the transistor P1.

First is described in detail how the motor control circuit 30 generates the control current signal A. A collector electrode of the transistor P6 supplies the reference current Iref to a collector electrode of npn transistor W1. Npn transistors W1 and W2 form a current mirror, in which the transistor W1 has its base electrode coupled to its collector electrode. In one embodiment, the transistor W2 may be designed to have an emitter size twice larger than that of the transistor W1, for supplying a twice-larger reference current. Npn transistors Aa to Ae form a current source, functioning as the current source 11 shown in FIG. 2(a). More specifically, the transistors Aa and Ab form a current mirror, in which the transistor Aa has its base electrode coupled to its collector electrode. The transistors Ac to Ae form a current output stage for amplifying the current from a collector electrode of the transistor Ab as the control current signal A. The current mirror formed by the transistors W1 and W2, functioning as the switch S1 shown in FIG. 2(a), is controlled in accordance with the forward and reverse rotation command signals FWD and REV through npn transistors V1, G1, and G2. More specifically, the transistor V1 functions as the inverter INV1 shown in FIG. 2(a) and the transistors G1 and G2 together function as the NOR gate NG1 shown in FIG. 2(a). A base electrode of the transistor V1 is coupled to receive the forward rotation command signal FWD, a base electrode of the transistor G1 is coupled to a collector electrode: of the transistor V1, and a base electrode of the transistor G2 is coupled to receive the reverse rotation command signal REV. Collector electrodes of the transistors G1 and G2 are together coupled to the base electrodes of the transistors W1 and W2. When the forward rotation command signal FWD is at the HIGH state and the reverse rotation command signal REV is at the LOW state, the transistors G1 and G2 are both turned off. The reference current Iref is allowed to pass the current mirror formed by the transistors W1 and W2 and then be supplied to the current source formed by the transistors Aa to Ae. In this case, the current source formed by the transistors Aa to Ae is allowed to output a predetermined current, serving as the control current signal A. When the forward rotation command signal FWD is at the LOW state, the transistor G1 is turned on to make the transistors W1 and W2 nonconductive. As a result, the reference current Iref is prevented from being supplied to the current source formed by the transistors Aa to Ae. In this case, the current source formed by the transistors Aa to Ae is prohibited from supplying any currents.

Subsequently is described in detail how the motor control circuit 30 generates the control current signal B. A collector electrode of the transistor P7 supplies the reference current Iref to a collector electrode of npn transistor W3. Npn transistors W3 and W4 form a current mirror, in which the transistor W3 has it base electrode coupled to its collector electrode. In one embodiment, the transistor W4 may be designed to have an emitter size equal to that of the transistor W3, for supplying the same reference current. Npn transistors Ba to Bc form a current source, functioning as the current source 12 shown in FIG. 2(a). More specifically, the transistors Ba and Bb form a current mirror, in which the transistor Ba has its base electrode coupled to its collector electrode. The transistor Bc forms a current output stage for amplifying the current from a collector electrode of the transistor Bb as the control current signal B. The current mirror formed by the transistors W3 and W4, functioning as the switch S2 shown in FIG. 2(a), is controlled in accordance with the forward rotation command signal FWD through npn transistors V1 and V2. More specifically, the transistor V1 functions as the inverter INV1 shown in FIG. 2(a) and the transistor V2 functions as the inverter INV2 shown in FIG. 2(a). A base electrode of the transistor V1 is coupled to receive the for ward rotation command signal FWD and a base electrode of the transistor V2 is coupled to a collector electrode of the transistor V1. A collector electrode of the transistor V2 is coupled to the base electrodes of the transistors W3 and W4. When the forward rotation command signal FWD is at the HIGH state, the transistor V2 is turned off. The reference current Iref is allowed to pass the current mirror formed by the transistors W3 and W4 and then be supplied to the current source formed by the transistors Ba to Bc. In this case, the current source formed by the transistors Ba to Bc is allowed to output a predetermined current, serving as the control current signal B. When the forward rotation command signal FWD is at the LOW state, the transistor V2 is turned on to make the transistors W3 and W4 nonconductive. As a result, the reference current Iref is prevented from being supplied to the current source formed by the transistors Ba to Bc. In this case, the current source formed by the transistors Ba to Bc is prohibited from supplying any currents.

Subsequently is described in detail how the motor control circuit 30 generates the control current signal C. A collector electrode of the transistor P5 supplies the reference current Iref to a collector electrode of npn transistor W5. Npn transistors W5 and W6 form a current mirror, in which the transistor W5 has its base electrode coupled to its collector electrode. In one embodiment, the transistor W6 may be designed to have an emitter size twice larger than that of the transistor W5, for supplying a twice-larger reference current. Npn transistors Ca to Ce form a current source, functioning as the current source 13 shown in FIG. 2(a). More specifically, the transistors Ca and Cb form a current mirror, in which the transistor Ca has its base electrode coupled to its collector electrode. The transistors Cc to Ce form a current output stage for amplifying the current from a collector electrode of the transistor Cb as the control current signal C. The current mirror formed by the transistors W5 and W6, functioning as the switch S3 shown in FIG. 2(a), is controlled in accordance with the forward and reverse rotation command signals FWD and REV through npn transistors V3, G3, and G4. More specifically, the transistor V3 functions as the inverter INV3 shown in FIG. 2(a) and the transistors G3 and G4 together function as the NOR gate NG2 shown in FIG. 2(a). A base electrode of the transistor V3 is coupled to receive the reverse rotation command signal REV, a base electrode of the transistor G3 is coupled to a collector electrode of the transistor V3, and a base electrode of the transistor G4 is coupled to receive the forward rotation command signal FWD. Collector electrodes of the transistors G3 and G4 are together coupled to the base electrodes of the transistors W5 and W6. When the reverse rotation command signal REV is at the HIGH state and the forward rotation command signal FWD is at the LOW state, the transistors G3 and G4 are both turned off. The reference current Iref is allowed to pass the current mirror formed by the transistors W5 and W6 and then be supplied to the current source formed by the transistors Ca to Ce. In this case, the current source formed by the transistors Ca to Ce is allowed to output a predetermined current, serving as the control current signal C. When the reverse rotation command signal REV is at the LOW state, the transistor G3 is turned on to make the transistors W5 and W6 nonconductive. As a result, the reference current Iref is prevented from being supplied to the current source formed by the transistors Ca to Ce. In this case, the current source formed by the transistors Ca to Ce is prohibited from supplying any currents.

Subsequently is described in detail how the motor control circuit 30 generates the control current signal D. A collector electrode of the transistor P4 supplies the reference current Iref to a collector electrode of npn transistor W7. Npn transistors W7 and W8 form a current mirror, in which the transistor W7 has it base electrode coupled to its collector electrode. In one embodiment, the transistor W8 may be designed to have an emitter size equal to that of the transistor W7, for supplying the same reference current. Npn transistors Da to Dc form a current source, functioning as the current source 14 shown in FIG. 2(a). More specifically, the transistors Da and Db form a current mirror, in which the transistor Da has its base electrode coupled to its collector electrode. The transistor Dc forms a current output stage for amplifying the current from a collector electrode of the transistor Db as the control current signal D. The current mirror formed by the transistors W7 and W8, functioning as the switch S4 shown in FIG. 2(a), is controlled in accordance with the reverse rotation command signal REV through npn transistors V3 and V4. More specifically, the transistor V3 functions as the inverter INV3 shown in FIG. 2(a) and the transistor V4 functions as the inverter INV4 shown in FIG. 2(a). A base electrode of the transistor V3 is coupled to receive the reverse rotation command signal REV and a base electrode of the transistor V4 is coupled to a collector electrode of the transistor V3. A collector electrode of the transistor V4 is coupled to the base electrodes of the transistors W7 and W8. When the reverse rotation command signal REV is at the HIGH state, the transistor V4 is turned off. The reference current Iref is allowed to pass the current mirror formed by the transistors W7 and W8 and then be supplied to the current source formed by the transistors Da to Dc. In this case, the current source formed by the transistors Da to Dc is allowed to output a predetermined current, serving as the control current signal D. When the reverse rotation command signal REV is at the LOW state, the transistor V4 is turned on to make the transistors W7 and W8 nonconductive. As a result, the reference current Iref is prevented from being supplied to the current source formed by the transistors Da to Dc. In this case, the current source formed by the transistors Da to Dc is prohibited from supplying any currents.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A motor control circuit for controlling a motor drive circuit to operate a motor among a forward rotation mode, a reverse rotation mode, and a brake mode, the motor control circuit comprising:
   a first current source from which a first current signal originates;
   a second current source from which a second current signal originates;
   a third current source from which a third current signal originates;
   a fourth current source from which a fourth current signal originates;
   a forward rotation control circuit for allowing the first current signal to be supplied to the motor drive circuit, thereby operating the motor in the forward rotation mode;
   a reverse rotation control circuit for allowing the third current signal to be supplied to the motor drive circuit, thereby operating the motor in the reverse rotation mode; and
   a brake control circuit for allowing the second and the fourth current signals to be both supplied to the motor drive circuit, thereby operating the motor in the brake mode.

2. The motor control circuit according to claim 1, wherein:
   the second current signal is smaller than the first current signal, and
   the fourth current signal is smaller than the third current signal.

3. The motor control circuit according to claim 1, wherein:
   the forward rotation control circuit comprises:
   a switch coupled to the first current source, and
   a logical circuit for controlling the switch in response to a forward rotation command signal and a reverse rotation command signal so as to allow the first current signal to be supplied to the motor drive circuit.

4. The motor control circuit according to claim 3, wherein:
   the switch comprises:
   a first transistor having a collector electrode, a base electrode, and an emitter electrode, the collector electrode being coupled to receive a reference current, the base electrode being coupled to the collector electrode, and the emitter electrode being coupled to a ground potential, and
   a second transistor having a collector electrode, a base electrode, and an emitter electrode, the collector electrode being coupled to the first current source, the base electrode being coupled to the base electrode of the first transistor, and the emitter electrode being coupled to the ground potential, wherein:
   the base electrode of the first transistor and the base electrode of the second transistor are controlled by the logical circuit.

5. The motor control circuit according to claim 3, wherein:
   the logical circuit comprises:
   an inverter having an input terminal and an output terminal, the input terminal being coupled to receive the forward rotation command signal, and
   a NOR gate having a first input terminal, a second input terminal, and an output terminal, the first input terminal being coupled to receive the reverse rotation command signal, the second input terminal being coupled to the output terminal of the inverter, and the output terminal being coupled to control the switch.

6. The motor control circuit according to claim 1, wherein:
   the reverse rotation control circuit comprises:
   a switch coupled to the third current source, and
   a logical circuit for controlling the switch in response to a forward rotation command signal and a reverse rotation command signal so as to allow the third current signal to be supplied to the motor drive circuit.

7. The motor control circuit according to claim 6, wherein:
   the switch comprises:
   a first transistor having a collector electrode, a base electrode, and an emitter electrode, the collector electrode being coupled to receive a reference current, the base electrode being coupled to the collector electrode, and the emitter electrode being coupled to a ground potential, and
   a second transistor having a collector electrode, a base electrode, and an emitter electrode, the collector electrode being coupled to the third current source, the base electrode being coupled to the base electrode of the first transistor, and the emitter electrode being coupled to the ground potential, wherein:
   the base electrode of the first transistor and the base electrode of the second transistor are controlled by the logical circuit.

8. The motor control circuit according to claim 6, wherein:
   the logical circuit comprises:
   an inverter having an input terminal and an output terminal, the input terminal being coupled to receive the reverse rotation command signal, and
   a NOR gate having a first input terminal, a second input terminal, and an output terminal, the first input terminal being coupled to receive the forward rotation command signal, the second input terminal being coupled to the output terminal of the inverter, and the output terminal being coupled to control the switch.

9. The motor control circuit according to claim 1, wherein:
   the brake control circuit comprises:
   a first switch coupled to the second current source for allowing the second current signal to be supplied to the motor drive circuit in response to a forward rotation command signal, and
   a second switch coupled to the fourth current source for allowing the fourth current signal to be supplied to the motor drive circuit in response to a reverse rotation command signal.

10. The motor control circuit according to claim 9, wherein:
    the first switch comprises:
    a first transistor having a collector electrode, a base electrode, and an emitter electrode, the collector electrode being coupled to receive a reference current, the base electrode being coupled to the collector electrode, and the emitter electrode being coupled to a ground potential, and
    a second transistor having a collector electrode, a base electrode, and an emitter electrode, the collector electrode being coupled to the second current source, the base electrode being coupled to the base electrode of the first transistor, and the emitter electrode being coupled to the ground potential, wherein:

the base electrode of the first transistor and the base electrode of the second transistor are controlled by the forward rotation command signal.

11. The motor control circuit according to claim 9, wherein:

the second switch comprises:

a first transistor having a collector electrode, a base electrode, and an emitter electrode, the collector electrode being coupled to receive a reference current, the base electrode being coupled to the collector electrode, and the emitter electrode being coupled to a ground potential, and a second transistor having a collector electrode, a base electrode, and an emitter electrode, the collector electrode being coupled to the fourth current source, the base electrode being coupled to the base electrode of the first transistor, and the emitter electrode being coupled to the ground potential, wherein:

the base electrode of the first transistor and the base electrode of the second transistor are controlled by the reverse rotation command signal.

12. The motor control circuit according to claim 9, wherein:

the brake control circuit further comprises:

a first inverter and a second inverter, connected in series, through which the forward rotation command signal controls the first switch, and a third inverter and a fourth inverter, connected in series, through which the reverse rotation command signal controls the second switch.

13. The motor control circuit according to claim 12, wherein:

each of the first to the fourth inverters is implemented by a bipolar transistor.

14. The motor control circuit according to claim 1, wherein:

each of the first to the fourth current sources is implemented by a constant current source.

15. The motor control circuit according to claim 1, wherein:

the motor drive circuit is implemented by an H-bridge drive circuit.

16. A motor control circuit comprising:

a rotation control circuit for providing a rotation current signal to control a rotation operation of a motor, and a brake control circuit for providing a brake current signal to control a brake operation of the motor, wherein:

the brake current signal and the rotation current signal originates from different current sources.

17. The motor control circuit according to claim 16, wherein:

the brake current signal is smaller than the rotation current signal.

18. The motor control circuit according to claim 16, wherein:

the rotation control circuit comprises:

a forward rotation control circuit for providing a forward rotation current signal to control a forward rotation operation of the motor, and a reverse rotation control circuit for providing a reverse rotation current signal to control a reverse rotation operation of the motor;

the rotation current signal comprises the forward rotation current signal and the reverse rotation current signal; and the rotation operation of the motor comprises the forward rotation operation and the reverse rotation operation.

19. The motor control circuit according to claim 16, further comprising:

a rotation current source, controlled by the rotation control circuit, from which the rotation current signal originates, and a brake current source, controlled by the brake control circuit, from which the brake current signal originates.

20. The motor control circuit according to claim 19, wherein:

the rotation control circuit comprises:

a forward rotation control circuit for providing a forward rotation current signal to control a forward rotation operation of the motor, and a reverse rotation control circuit for providing a reverse rotation current signal to control a reverse rotation operation of the motor;

the rotation current signal comprises the forward rotation current signal and the reverse rotation current signal;

the rotation operation of the motor comprises the forward rotation operation and the reverse rotation operation;

the rotation current source comprises:

a forward rotation current source, controlled by the forward rotation control circuit, from which the forward rotation current signal originates, and a reverse rotation current source, controlled by the reverse rotation control circuit, from which the reverse rotation current signal originates; and the brake current source comprises:

a first brake current source and a second brake current source, controlled by the brake control circuit, from which the brake current signal originates.

* * * * *